United States Patent
Nebioglu et al.

(10) Patent No.: US 11,897,978 B2
(45) Date of Patent: Feb. 13, 2024

(54) HYBRID LIGHT-CURING COMPOSITION

(71) Applicant: Dymax Corporation, Torrington, CT (US)

(72) Inventors: Ahmet Nebioglu, Collinsville, CT (US); Aysegul Kascatan Nebioglu, Collinsville, CT (US); Sushanta Das, Winsted, CT (US); Keith Plimpton, Coventry, CT (US)

(73) Assignee: DYMAX CORPORATION, Torrington, CT (US)

( * ) Notice: Subject to any disclaimer, the term of this patent is extended or adjusted under 35 U.S.C. 154(b) by 126 days.

(21) Appl. No.: 17/211,152

(22) Filed: Mar. 24, 2021

(65) Prior Publication Data
US 2021/0301045 A1 Sep. 30, 2021

Related U.S. Application Data

(60) Provisional application No. 63/002,664, filed on Mar. 31, 2020.

(51) Int. Cl.
*C08F 20/34* (2006.01)
*C08K 5/05* (2006.01)
*C07F 17/02* (2006.01)
*C08F 4/32* (2006.01)
*C08F 4/42* (2006.01)

(52) U.S. Cl.
CPC .............. *C08F 20/34* (2013.01); *C07F 17/02* (2013.01); *C08F 4/32* (2013.01); *C08F 4/42* (2013.01); *C08K 5/05* (2013.01)

(58) Field of Classification Search
CPC .... C08F 4/42; C08F 4/32; C08F 20/34; C07F 17/02; C08K 5/05
See application file for complete search history.

(56) References Cited

U.S. PATENT DOCUMENTS

| | | |
|---|---|---|
| 5,922,783 A | 7/1999 | Wojciak |
| 6,734,221 B1 | 5/2004 | Misiak |
| 6,867,241 B2 | 3/2005 | Wojciak et al. |
| 6,906,112 B1 | 6/2005 | Wojciak et al. |
| 7,064,155 B2 | 6/2006 | Wojciak |
| 9,340,704 B2 | 5/2016 | Cayer et al. |
| 2007/0004836 A1 | 1/2007 | Bachmann et al. |
| 2018/0215973 A1 | 8/2018 | López Maeso et al. |

FOREIGN PATENT DOCUMENTS

| | | | | |
|---|---|---|---|---|
| EP | 0026339 A1 * | 4/1981 | ............... | C09D 3/80 |
| EP | 0026339 A1 | 4/1981 | | |
| EP | 2154214 A2 * | 2/2010 | ............... | C09J 4/00 |
| EP | 2154214 A2 | 2/2010 | | |
| JP | 2001089626 A | 4/2001 | | |

OTHER PUBLICATIONS

International Search Report; International Application No. PCT/US2021/023423; International Filing Date: Mar. 22, 2021; dated Jul. 1, 2021; 4 pages.
Written Opinion; International Application No. PCT/US2021/023423; International Filing Date: Mar. 22, 2021; dated Jul. 1, 2021; 5 pages.
Swiderski et al.; "Urethane Acrylate Oligomers and UV/EB Curing: A Disruptive Techonology for Traditional Urethane Prepolymers"; Bomar Specialites.

* cited by examiner

*Primary Examiner* — Robert D Harlan
(74) *Attorney, Agent, or Firm* — CANTOR COLBURN LLP

(57) ABSTRACT

In an aspect, a curable composition comprises an acid catalyzed urethane (meth)acrylate oligomer comprising an acid catalyst; a cyanoacrylate monomer; a metallocene compound; a free radical polymerization inhibitor; and an acidic anionic polymerization inhibitor. In yet another aspect, a method of making a cured composition comprises forming the curable composition; and curing the curable composition by exposing it to light to form the cured composition.

20 Claims, No Drawings

HYBRID LIGHT-CURING COMPOSITION

CROSS-REFERENCE TO RELATED APPLICATION

This application claims the benefit of U.S. Provisional Patent Application Ser. No. 63/002,664 filed Mar. 31, 2020. The related application is incorporated herein in its entirety by reference.

BACKGROUND

This disclosure relates to a hybrid light-curing composition.

Curable compositions based on urethane (meth)acrylate oligomer technology are commonly used in many different applications such as coatings, adhesives, sealants, and inks as they can be easily cured by visible light, ultraviolet light, or electron beam irradiation. Urethane (meth)acrylate oligomers can be formed by preparing a urethane prepolymer having isocyanate endgroups and then functionalizing the isocyanate endgroups with a reactive acrylate that does not dissociate at increased temperature such as 2-hydroxyethyl (meth)acrylate. The urethane (meth)acrylate oligomers can then be cured by reacting the urethane acrylate oligomer with itself, if the molecular weight is low enough, or with a multifunctional acrylate monomer to effect a more complete cure.

Although the technology of forming such cured compositions is continually improving, there still remains significant problems in effecting cure in regions where the radiation source is blocked. These shadowed regions thereby contain uncured material that poses a product reliability risk and that can weaken the material or adhesive bond over time.

It is therefore desirable to develop a urethane (meth) acrylate with improved cure performance.

BRIEF SUMMARY

Disclosed herein is hybrid light-curing composition.

In an aspect, a curable composition comprises an acid catalyzed urethane (meth)acrylate oligomer comprising an acid catalyst; a cyanoacrylate monomer; a metallocene compound; a free radical polymerization inhibitor; and an acidic anionic polymerization inhibitor.

In another aspect, a curable composition comprises 0.1 to 30 wt % of an acid catalyzed urethane (meth)acrylate oligomer having a structure of at least one of Formula (1) or Formula (2) that was made with 0.05 to 6 wt % of the acid catalyst based on the total weight of the urethane (meth) acrylate oligomer:

wherein each A independently is a monohydroxy functional (meth)acrylate group; each D independently is derived from a di- or tri-functional isocyanate group; each P independently is derived from a polyol having a weight average molecular weight of 50 to 12,000 Daltons based on polystyrene standards; and n is 10 to 100; 20 to 98 wt % of a cyanoacrylate monomer; 0.005 to 4 wt %, or 0.01 to 2 wt % of a metallocene compound; 0.001 to 1 wt % of a free radical polymerization inhibitor; and 0.1 wt % of an acidic anionic polymerization inhibitor.

In an aspect, a cured composition is derived from the curable composition.

In yet another aspect, a method of making a cured composition comprises forming the curable composition; and curing the curable composition by exposing it to light to form the cured composition.

The above described and other features are exemplified by the following detailed description and claims.

DETAILED DESCRIPTION

Cyanoacrylate compositions are resistant, fast curing adhesives based on esters of 2-cyanoacrylic acid. These cyanoacrylate compositions are generally known as super glues or instant adhesives and are unique with regard to their speed of cure without requiring heat or light and for their ability to adhere to many different surfaces. Attempts to combine these cyanoacrylate monomers though with urethane (meth)acrylate oligomers to improve the cure of urethane (meth)acrylate compositions have been fraught with problems. Specifically, urethane (meth)acrylate oligomers are generally formed in the presence of a metal based catalyst or an amine based catalyst. This residual catalyst in the urethane (meth)acrylate oligomer catalyzes the reaction with the cyanoacrylate monomer when mixed with the urethane (meth)acrylate oligomers, resulting in the formation of a gel. In most cases, the residual catalyst results in near instantaneous gel formation, thereby preventing formation of the desired cured composition.

It was unexpectedly discovered that a curable composition comprising an acid catalyzed urethane (meth)acrylate oligomer and a cyanoacrylate monomer can form a stable composition that can be cured to form cured composition having improved cure performance. For example, the improved cure can refer to the fact that areas that are shadowed from the radiation source can be cured without the exposure to radiation. Specifically, the curable composition comprises an acid catalyzed urethane (meth)acrylate oligomer; a cyanoacrylate monomer; a metallocene compound; a free radical polymerization inhibitor; and an acidic anionic polymerization inhibitor.

The acid catalyzed urethane (meth)acrylate oligomer (also referred to herein below as a urethane (meth)acrylate oligomer) can have a structure of at least one of Formula (1) or Formula (2).

Each A independently can be a monohydroxy functional (meth)acrylate group; each D independently can be a di- or tri-functional isocyanate group; each P independently can be a polyol having a weight average molecular weight of 50 to 12,000 Daltons, or 100 to 900 Daltons based on polystyrene standards; and n can be 1 to 100, or 5 to 75.

Each D independently can be derived from a diisocyanate. Non-exclusive examples of diisocyanates include hexamethylene diisocyanate, trimethyl hexamethylene diisocyanate, bis(4-isocyanatocyclohexyl)methane, isophorone diisocyanate, tetramethylxylene diisocyanate, trimethylhexamethylene diisocyanate, toluene diisocyanate, or isophorone diisocyanate.

Each P independently can be derived from an oligomeric diol. Non-exclusive examples of the oligomeric diol include 1,4-butanediol, neopentylglycol, diethylene glycol, 2-methyl-1,3-propanediol, glycerol, trimethylolpropane, a polyester glycol, a polypropylene glycol, a polytetramethylene glycol, a polycaprolactone glycol, or a polycarbonate glycol.

The urethane (meth)acrylate oligomer can comprise at least one of a polyester of hexanedioic acid and diethylene glycol, reacted with isophorone diisocyanate, capped with 2-hydroxyethyl (meth)acrylate; a polypropylene glycol reacted with tolyene-2,6-diisocyanate, capped with 2-hydroxyethyl (meth)acrylate; a polyester of hexanedioic acid and diethylene glycol, reacted with 4,4'-methylenebis(cyclohexyl isocyanate), capped with 2-hydroxyethyl (meth) acrylate; a polyester of hexanedioic acid, 1,2-ethanediol, and 1,2 propanediol, reacted with tolylene-2,4-diisocyanate, capped with 2-hydroxyethyl (meth)acrylate; a polyester of hexanedioic acid, 1,2-ethanediol, and 1,2 propanediol, reacted with 4,4'-methylenebis(cyclohexyl isocyanate), capped with 2-hydroxyethyl (meth)acrylate; a polyester of hexanedioic acid, diethylene glycol, reacted with isophorone diisocyanate, capped with 2-hydroxyethyl (meth)acrylate; a polytetramethylene glycol ether reacted with 4,4'-methylenebis(cyclohexylisocyanate), capped with 2-hydroxyethyl (meth)acrylate; or a polypropylene glycol reacted with tetramethylxylene diisocyanate, capped with 2-hydroxyethyl (meth)acrylate. It is noted that the capping agent refers to the A group of formula (1) and formula (2).

The curable composition can comprise 0.1 to 30 wt %, or 1 to 20 wt % of the urethane (meth)acrylate oligomer based on the total weight of the curable composition.

The curable composition can comprise a urethane (meth)acrylate oligomer that is an acid catalyzed urethane (meth)acrylate comprising a residual amount of the acid catalyst. In other words, the catalyst used to form the urethane (meth)acrylate oligomer can be an acid catalyst. The urethane (meth)acrylate oligomer can be free of a metal based catalyst or an amine based catalyst, for example, comprising 0 to 0.001 wt %, or 0 wt % of a metal based catalyst or an amine based catalyst based on the total weight of the urethane (meth)acrylate oligomer.

The acid catalyst can comprise at least one of a nonmetallic Lewis acid (for example, boron trifluoride, boron trifluoride etherate) or an organic acid (such as methane sulfonic acid (MSA), para-toluene-sulfonic acid (pTSA), sulfuric acid, triflic acid, hypophosphorous acid, phosphoric acid, or diphenyl phosphate). The acid catalyst can comprise methane sulfonic acid (MSA). The acid catalyst can be a residual catalyst present in the urethane (meth)acrylate oligomer and will therefore be present in the curable composition. The acid catalyst can be present in an amount of 0.05 to 6 wt %, or 0.2 to 3 wt % based on the total weight of the urethane (meth)acrylate oligomer.

The curable composition can be free of a metal based catalyst or an amine based catalyst. Examples of metal based catalysts include bismuth octoate, bismuth neodecanoate dibutyltin di-2-hexoate, dibutyltin diacetate, dibutyltin dilaurate, dibutyltin oxide, ferrous acetoacetate, lead octoate, stannous octoate, stannous oleate, zinc neodecanoate, and zinc octoate. Examples of amine based catalyst include tertiary amines (for example, 1,3,5-tris(3-[dimethylamino]propyl)-hexahydro-s-triazine, 1,4-diazabicyclo[2.2.2]octane, or N,N-dimethylcyclohexylamine).

The cyanoacrylate monomer can have the formula (3).

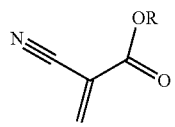

(3)

R can be a $C_{1-15}$ alkyl, alkoxy alkyl, cycloalkyl, alkenyl, aralkyl, aryl, allyl, or haloalkyl group. The cyanoacrylate monomer can comprise at least one of methyl cyanoacrylate, ethyl-2-cyanoacrylate, propyl cyanoacrylate (for example, isopropyl cyanoacrylate), butyl cyanoacrylate, octyl cyanoacrylate, allyl-2-cyanoacrylate, or β-methoxyethyl-2-cyanoacrylate. The curable composition can comprise 20 to 98 wt %, or 40 to 70 wt % of the cyanoacrylate monomer based on the total weight of the curable composition.

The metallocene compound can comprise a compound having the formula (4).

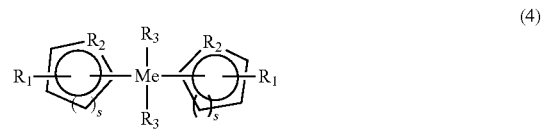

(4)

Each $R_1$ independently can be H; a $C_{1-8}$ alkyl group (for example, $-CH_3$, $-CH_2CH_3$, $-CH_2CH_2CH_3$, $-CH(CH_3)_2$, $-C(CH_3)_3$); an acetyl group; a vinyl group; an allyl group; a carboxyl group; a hydroxyl group; $-(CH_2)_m-COOR_4$, wherein m can be an integer 1 to 8 and $R_4$ can be a $C_{1-8}$ alkyl group, H, Li, or Na; $-(CH_2)_m-OR_5$, wherein m can be an integer 1 to 8 and $R_5$ can be a $C_{1-8}$ alkyl group or H; $-(CH_2)_p-N^+(CH_3)_3X^-$, wherein p can be an integer 1 to 8 and X can be Cl, Br, I, $ClO_4$, or $BF_4$. Each $R_2$ independently can be C or N and each s independently can be 1 or 2. Me can be Ag, Co, Cr, Cu, Fe, Hf, Mn, Mo, Nb, Ni, Pd, Pt, Rh, Ru, Ti, V, or Zr. Me can be Fe or Ti. Me can comprise additional ligands, $R_3$, associated therewith. Each $R_3$ independently can be $H^-$, $Cl^-$, $Br^-$, $I^-$, a cyano group, a methoxy group, an acetyl group, a hydroxy group, a nitro group, a trialkyl amine, a triaryl amine, a trialkyl phosphine, a triphenyl amine, or a tosyl group. Other metallocene compounds can likewise be used instead of or in conjunction with the metallocene compound of formula (4).

The metallocene compound can comprise at least one of a ferrocene or a titanocene. The ferrocene can comprise a vinyl ferrocene, a bis-alkyl ferrocene (for example, diferrocenyl ethane, diferrocenyl propane, or diferrocenyl butane), a ferrocene derivative (for example, a butyl ferrocene or a diarylphosphino metal-complexed ferrocene (for example, 1,1-bis (diphenylphosphino) ferrocene-palladium dichloride)). The titanocene can comprise bis(η5-2,4-cyclopentadien-1-yl)-bis-[2,6-difluoro-3-(1H-pyrrol-1-yl)phenyl] titanium.

The metallocene compound can be present in an amount of 0.005 to 4 wt %, or 0.01 to 2 wt % based on the total weight of the curable composition.

The curable composition can comprise a photoinitiator. The photoinitiator can enhance the rapidity of the curing process upon exposure to an electromagnetic radiation. The photoinitiator can comprise a photoinitiator such as those commercially from IGM Resins, under the "OMNIRAD" tradename. For example, the photoinitiator can comprise OMNIRAD 184 (1-hydroxycyclohexyl phenyl ketone), OMNIRAD 500 (1-hydroxy cyclohexyl phenyl ketone and benzophenone), OMNIRAD 651 (2,2-dimethoxy-2-phenyl acetophenone), OMNIRAD 819 (bis(2,4,6-trimethyl benzoyl) phenyl phosphine oxide), OMNIRAD 1173 (2-hydroxy-2-methyl-1-phenyl-1-propan-1-one), OMNIRAD 4265 (2,4,6-trimethylbenzoyldiphenyl-phosphine oxide and 2-hydroxy-2-methyl-1-phenyl-propan-1-one), a visible light [blue] photoinitiator, dl-camphorquinone, or OMNIRAD 784. It is noted that certain metallocene photoinitiators can function both as a metallocene and as a photoinitiator. The photoinitiator can comprise at least one of an alkyl pyruvate (for example, methyl, ethyl, propyl, or butyl pyruvate) or an aryl pyruvate (for example, phenyl, benzyl, or a substituted aryl pyruvate). The photoinitiator can comprise OMNIRAD 819 (bis(2,4,6-trimethyl benzoyl) phenyl phosphine oxide).

The curable composition can comprise a photosensitizer. The photosensitizer can enable the photoinitiator to be responsive to radiation, for example, beyond the UV range. The photosensitizer can comprise at least one of benzophenone, isopropyl thioxanthone, 2-chloro-thioxanthone, chloro-4-propoxy-thioxanthone, 2,4-diethyl-thioxanthone, or 2-ethyl-9,10-dimethoxy-anthracene.

The free radical polymerization inhibitor can comprise at least one of hydroquinone, catechol, beta-naphthol, mono-t-butyl hydroquinone, pyrogallol, 4-methoxy phenol (also referred to as hydroquinone monomethyl ether), 4-tert-butylphenol, 2,5-di-tert-butylhydroquinone or 2,6-di-tert-butyl-4-methylphenol. The free radical polymerization inhibitor can be present in an amount of 0.001 to 1 wt %, or 0.01 to 0.5 wt % based on the total weight of the curable composition.

The acidic anionic polymerization inhibitor can comprise at least one of a lewis acid (for example, boron trifluoride or boron trifluoride etherate), carboxylic acid, or a sulfonic acid (for example, a p-toluenesulfonic acid). The carboxylic acid can comprise at least one of an acrylic acid, a methacrylic acid, an acetic acid, an ascorbic acid, an oxalic, a phthalic acid, an itaconic acid, a crotonic acid, a 4-methoxyphenyl acetic acid, a 3,5-dihydroxybenzoic acid, or a 3,3-dimethylaminobenzoic acid. The acidic anionic polymerization inhibitor can be present in an amount of 0.001 to 0.5 wt %, or 0.001 to 1 wt %, or 0.001 to 0.1 wt % based on the total weight of the curable composition.

The curable composition can comprise a multifunctional (meth)acrylate oligomer. The multifunctional (meth)acrylate oligomer can comprise at least one of polyethyleneglycol diacrylate, polypropyleneglycol diacrylate, polybutyleneglycol diacrylate, propoxylated trimethylolpropane triacrylate, or ethoxylated trimethylolpropane triacrylate. The multifunctional oligomer can be present in an amount of greater than 0 to 60 wt %, or 1 to 50 wt % based on the total weight of the curable composition.

The curable composition can comprise a (meth)acrylate functional monomer. The (meth)acrylate functional monomer can act as a reactive diluent in the curable composition. The (meth)acrylate functional monomer can comprise at least one of butanediol diacrylate, hexanedioldiacrylate, trimethylolpropane triacrylate, or pentaerythritol tetraacrylate, isobornyl acrylate, isobornyl methacrylate, isodecyl acrylate, ethylhexyl acrylate, or tetrahydrofurfuryl methacrylate. The (meth)acrylate functional monomer can be present in an amount of greater than 0 to 30 wt %, or 1 to 25 wt % based on the total weight of the curable composition.

The curable composition can comprise one or more additional additives. For example, the curable composition can comprise at least one of a filler, a silane coupling agent, a colorant, a flame retardant, a viscosity modifier (that can be the same or different from the filler), an electrically conductive component, a thermally conductive component, a defoamer, a plasticizer, an adhesion promoter, a non-alcohol solvent, or a reactive diluent.

The filler can comprise at least one of polymethylmethacrylate or derivatives thereof, wood flour, cornstarch, cotton linters, mica, hydrophobic modified silica, or the like. The fillers can be added to modify at least one of the viscosity of the curable composition or to improve the impact resistance of the cured composition. The silane coupling agent can increase the moisture resistance as well as to enhance bond strength to the substrate. The colorant can comprise at least one of a dye, a fluorescing agent, a pigment, or the like. The dye can comprise an arylmethane dye (for example, a cationic triphenyl methane compound). The dye can comprise at least one of Crystal Violet, Victoria Blue, Malachite Green, or New Fuchsin. The viscosity modifier can comprise at least one of a thixotrope, a thickener (for example, a silica gel), or a viscosity reducer. The electrically conductive material can comprise at least one of graphene or carbon nanotubes. The non-alcohol solvent can comprise at least one of butan-2-one, heptan-2-one, butyl acetate, ethyl acetate, propyl acetate, or acetone. The plasticizer can comprise at least one of triacetin, dioctyl phthalate, dibutyl phthalate, butyl phthalyl, butyl glycolate, tricresyl, phosphate, a polyester, or a chlorinated paraffin.

The curable composition can comprise 0.1 to 30 wt % of the urethane (meth)acrylate oligomer having a structure of at least one of Formula (1) or Formula (2) made with 0.05 to 6 wt % of the acid catalyst based on the total weight of the urethane (meth)acrylate oligomer; 20 to 98 wt % of the cyanoacrylate monomer; 0.005 to 4 wt %, or 0.01 to 2 wt % of the metallocene compound; 0.001 to 1 wt % of the free radical polymerization inhibitor; and 0.001 to 0.1 wt % of the acidic anionic polymerization inhibitor; wherein, unless otherwise stated, the amounts are based on the total weight of the curable composition.

A cured composition can be derived from the curable composition. An article can comprise the cured composition. The curable composition can be an adhesive for use in medical devices (for example, a catheter), electronics, or nail coatings. The cured composition can be a coating, an adhesive, a sealant, an ink, or an article.

The cured composition can be cured tack-free via at least one of light or moisture from the curable composition.

A method of making a cured composition from the curable composition can comprise forming the curable composition; and curing the curable composition by exposing it to an electromagnetic radiation that causes curing of the curable composition (also referred to herein as a curing radiation). The electromagnetic radiation can include at least one of ultraviolet (UV) radiation or radiation in the visible region. A radiation source (also referred to herein as a source) can emit the electromagnetic radiation, for example, having a wavelength of 390 to 410 nanometers (nm), or 400 to 405 nm. The curing can result in a complete or nearly complete cure of the curable composition, even in shadowed regions.

The electromagnetic radiation can be emitted from a source. Examples of sources include a solar source, a fluorescent light source, an ultraviolet (UV) light source, a visible light source. The source can include a lamp (for example, a mercury arc lamp or a xenon arc lamp). The source can include at least one of an A-type UV lamp, a D-type UV lamp, an H-type UV lamp, an M-type UV lame, a V-type UV lamp, or an X-type UV lamp. The source can include a light emitting diode (LED).

The curing can occur in a curing chamber with optional rotation or relative movement to the curing radiation. The curing can comprise selectively directing the electromagnetic radiation source, for example, with the help of reflectors or filters. During the curing, the substrate can be positioned 0.5 to 5 5 centimeters from the radiation source. The curing time can be 0.1 second to 5 minutes, or 1 to 60 seconds. The exposure intensity can be 0.01 to 600 watts per centimeter squared (W/cm$^2$), or 0.1 to 450 W/cm$^2$, or 1 to 300 W/cm$^2$.

The source can be housed in an illumination device. The illumination device can comprise an optical light concentrator that is substantially transparent to light in the ultraviolet and/or visible region. The light concentrator can have a light input region and a light output region along its length. Several sources (for example, light emitting diodes) can be positioned, one at each light input end of a series of light guides. The light output end of each of the light guides can abut the light concentrator along its length at the light input region, thus allowing concentrated light to be emitted along the length of the light output region of the concentrator such that the concentrated light is directed toward the curable composition. An example of such an illumination device can be found in U.S. Pat. No. 8,134,132, which is incorporated herein in its entirety.

The method can further comprise depositing the curable composition prior to the curing. For example, the method can comprise depositing an amount of the curable composition onto a substrate and curing the curable composition to form the cured composition. The depositing can comprise dispensing the curable composition onto a substrate in any desired form, for example, as a droplet, a line, or a layer. The depositing can comprise coating (for example, by dip coating, curtain coating, spin coating, roller coating, brush coating, or transfer coating), casting, dispensing in a dropwise manner, dispensing in a continuous manner (for example, to form lines, continuous, dashed, wavy, or otherwise), or the like. The depositing can be performed in an environment free of a curing radiation. For example, the depositing can occur in a dark environment. The temperature during the dispensing can be modified to adjust the viscosity of the curable composition during the dispensing. For example, the temperature during the dispensing can be 10 to 50° C. Prior to the depositing, the curable composition can be stored in a dark environment or in a container impervious to the curing radiation.

The method of forming the cured composition can comprise forming a multilayer stack. For example, a multilayer stack comprising the curable composition located between two outer substrates can be pressed together, for example, by at least one of laminating, calendering, vacuum bagging, or rolling pressing prior to and/or during the curing. One or both of the substrates can be a release liner that can subsequently be removed from the cured composition.

The substrate can comprise at least one of glass, wood, a polymer, or a metal. The substrate can comprise at least one of a polymer or glass. The polymer can comprise at least one of an acrylic, an epoxy, a polyamide, a polycarbonate, a poly(ether imide), a polyimide, a polyolefin (for example, a polyethylene or a polypropylene), a polyurethane, a polysulfone, a polystyrene, or a poly(vinyl acetate). The substrate can be rigid or flexible. The substrate can be a fabric, for example, a woven or a non-woven fabric. The substrate can be porous, for example, a foam. The substrate can be free of a void space.

The following examples are provided to illustrate the present disclosure. The examples are merely illustrative and are not intended to limit devices made in accordance with the disclosure to the materials, conditions, or process parameters set forth therein.

EXAMPLES

In the examples, the following test methods and procedures were used.

The tack-free time in seconds (s) is the time for a coating having a 5 mil (127 micrometer) thickness coating on stainless steel to become tack-free with exposure to a 405 nanometer (nm) LED light with a light intensity of 100 milliwatts per centimeter squared (mW/cm$^2$). The tack-free time test is based on ASTM method C679-03 where a polyethylene film with 30 grams of weight is placed on top of the cured material. There should be essentially no materials transferred to polyethylene film from a tack-free surface when it is peeled.

The fixture time in seconds is the time for an adhesive having a 5 mil (127 micrometer) thickness between glass slides to bind the glass slides together without exposure to light. Fixture time is defined as the time to develop a shear strength of 10 pounds per square inch (69 kilopascal) between glass slides. Fixture time testing is based on ASTM method D1144.

The maximum load retention in percent (%) is the load that the material can withstand during a lap-shear test between two glass slides after being exposed to a temperature of 60 degrees Celsius (° C.) and a relative humidity of 90% for one week. Lap-shear testing was done according to ASTM method D3163-01(2014) where two glide slides with 0.125 inches (3.2 centimeters) overlap were bonded by the example materials and pushed until failure.

The components used in the examples are shown in Table 1.

TABLE 1

| | |
|---|---|
| urethane (meth)acrylate oligomer | Polypropylene glycol reacted with tetramethylxylene diisocyanate, capped with 2-hydroxyethylacrylate. Methansulphonic was used as the catalyst. |
| Multifunctional oligomer | Trimethylolpropane propoxylate triacrylate |
| Cyanoacrylate monomer | Ethyl 2-cyanoacrylate |
| Stabilizer | Boron trifluorite (BF3), Methanesulfonic acid (MSA), Methylethylhydroquinone (MEHQ), Butylated hydroxytoluene (BHT) |
| Metallocene | Ferrocene |
| Photoinitiator | Phenylbis(2,4,6-trimethylbenzoyl) phosphine oxide) Omnirad 819 |
| Other additives | Methacryloxypropyltrimethoxysilane |

Examples 1-11: Effect of Copolymerization with a Urethane (Meth)Acrylate Oligomer Eleven curable compositions were prepared using the amounts shown in Table 1, where the cyanoacrylate mixture comprised 96.1 wt % of the cyanoacrylate, 0.4 wt % of the stabilizer, 0.5 wt % of the metallocene, 1 wt % of the photoinitiator, and 2 wt % of the other additives. In Example 1 the only monomer included in the polymerization was the cyanoacrylate monomer. In Example 2 and Example 3, both the cyanoacrylate and varying amounts of the multifunctional oligomer were included in the polymerization. In Examples 4-11, the cyanoacrylate and varying amounts of the urethane (meth)acrylate oligomer with and without the multifunctional oligomer were included in the polymerization. The curable compositions were cured on exposure to 385 nanometer LED light with 100 mW/cm$^2$ irradiance for 30 seconds.

The tack-free time, the fixture time, and the maximum load retention values were determined for each composition and the results are shown in Table 2.

TABLE 2

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Urethane (meth)acrylate oligomer (wt %) | — | — | — | 5 | 5 | 4 | 6 | 5 | 5 | 8 | 20 |
| Multifunctional oligomer (wt %) | — | 8 | 16 | — | 8 | 8 | 8 | 16 | 25 | 25 | 29 |
| Cyanoacrylate mixture (wt %) | 100 | 92 | 84 | 95 | 88 | 87 | 86 | 79 | 70 | 67 | 51 |
| Properties | | | | | | | | | | | |
| Tack-free time (s) | 3 | 1 | 1 | 1 | 1 | 1 | 1 | 1 | 3 | 3 | 10 |
| Fixture time (s) | 5 | 5 | 5 | 5 | 5 | 5 | 5 | 5 | 5 | 5 | 10 |
| Maximum load retention (%) | 7 | 28 | 5 | 60 | 132 | 118 | 117 | 131 | 146 | 154 | 125 |

Table 2 shows that Examples 1-3 that were free of the urethane (meth)acrylate oligomer all disadvantageously retained less than 30% of their maximum load after being exposed to the high temperature and humidity conditions. Example 4 shows that incorporating even just 5 wt % of the urethane (meth)acrylate oligomer results in a significant improvement in the maximum load retention and Examples 5-11 show further improvements when the multifunctional oligomer is present. These improvements illustrate that the maximum load did not decrease upon exposure to heat and humidity, but beneficially increased. It is noted that Examples 5-11 that included both the urethane (meth)acrylate oligomer and the multifunctional oligomer all exhibited a more than 100% retention of the maximum load with heat and humidity.

Examples 12-13: Effect of Urethane (Meth)Acrylate Oligomer Catalyst

Two formulations were prepared with the same ingredients except the catalyst to make urethane (meth)acrylate oligomers. Example 12 was prepared with a urethane (meth) acrylate oligomer that was made using a metallic catalyst, BisOct (bismuth octoate). Example 13 was prepared with a urethane (meth)acrylate oligomer that was made with non-metallic catalyst, MSA. Table 3 shows the stability of the formulations. The formulation in Example 12 was not stable and formed a gel within 1 hour of mixing whereas the formulation in Example 13 was stable even at elevated temperature, such as 40° C. for at least 1 week.

TABLE 3

| Example | 12 | 13 |
|---|---|---|
| Urethane (meth)acrylate oligomer made with MSA (wt %) | — | 1 |
| Urethane (meth)acrylate oligomer is with BisOct (wt %) | 1 | — |
| Cyanoacrylate mixture (wt %) | 99 | 99 |
| Stability | Gels within 1 hour at 25° C. | Liquid for at least 1 week at 40° C. |

Set forth below are non-limiting aspects of the present disclosure.

Aspect 1: A curable composition comprising: an acid catalyzed urethane (meth)acrylate oligomer comprising an acid catalyst; a cyanoacrylate monomer; a metallocene compound; a free radical polymerization inhibitor; and an acidic anionic polymerization inhibitor.

Aspect 2: The curable composition of Aspect 1, wherein the acid catalyzed urethane (meth)acrylate oligomer has a structure of at least one of Formula (1) or Formula (2):

$$A\text{-}D\text{-}(PD)_n\text{-}A \quad (1)$$

$$A\text{-}(PD)_n\text{-}P\text{-}A \quad (2)$$

wherein each A independently is a monohydroxy functional (meth)acrylate group; each D independently is a di- or tri-functional isocyanate group; each P independently is a polyol having a weight average molecular weight of 100 50 to 12,000 Daltons based on polystyrene standards; and n is 1 to 100.

Aspect 3: The curable composition of any of the preceding aspects, wherein the acid catalyzed urethane (meth) acrylate oligomer comprises at least one of a polyester of hexanedioic acid and diethylene glycol, reacted with isophorone diisocyanate, capped with 2-hydroxyethyl (meth) acrylate; a polypropylene glycol reacted with tolyene-2,6-diisocyanate, capped with 2-hydroxyethyl (meth)acrylate; a polyester of hexanedioic acid and diethylene glycol, reacted with 4,4'-methylenebis(cyclohexyl isocyanate), capped with 2-hydroxyethyl (meth)acrylate; a polyester of hexanedioic acid, 1,2-ethanediol, and 1,2 propanediol, reacted with tolylene-2,4-diisocyanate, capped with 2-hydroxyethyl (meth)acrylate; a polyester of hexanedioic acid, 1,2-ethanediol, and 1,2 propanediol, reacted with 4,4'-methylenebis (cyclohexyl isocyanate), capped with 2-hydroxyethyl (meth) acrylate; a polyester of hexanedioic acid, diethylene glycol, reacted with isophorone diisocyanate, capped with 2-hydroxyethyl (meth)acrylate; a polytetramethylene glycol ether reacted with 4,4'-methylenebis(cyclohexylisocyanate), capped with 2-hydroxyethyl (meth)acrylate; or a polypropylene glycol reacted with tetramethylxylene diisocyanate, capped with 2-hydroxyethyl (meth)acrylate.

Aspect 4: The curable composition of any of the preceding aspects, wherein the curable composition comprises 0.1 to 30 wt % of the acid catalyzed urethane (meth)acrylate based on the total weight of the curable composition.

Aspect 5: The curable composition of any of the preceding aspects, wherein the acid catalyst comprises at least one of a nonmetallic Lewis acid or an organic acid: preferably methane sulfonic acid.

Aspect 6: The curable composition of any of the preceding aspects, wherein the acid catalyst is present in an amount of 0.05 to 6 wt % based on the total weight of the urethane (meth)acrylate oligomer.

Aspect 7: The curable composition of any of the preceding aspects, wherein the cyanoacrylate monomer has the structure

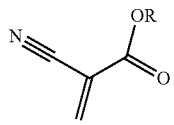

wherein R is a $C_{1-15}$ alkyl, alkoxy alkyl, cycloalkyl, alkenyl, aralkyl, aryl, allyl, or haloalkyl group.

Aspect 8: The curable composition of any of the preceding aspects, wherein the cyanoacrylate monomer comprises at least one of methyl cyanoacrylate, ethyl-2-cyanoacrylate, propyl cyanoacrylate (for example, isopropyl cyanoacrylate), butyl cyanoacrylate, octyl cyanoacrylate, allyl-2-cyanoacrylate, or β-methoxyethyl-2-cyanoacrylate.

Aspect 9: The curable composition of any of the preceding aspects, wherein the curable composition comprises 20 to 98 wt % of the cyanoacrylate monomer based on the total weight of the curable composition.

Aspect 10: The curable composition of any of the preceding aspects, wherein the metallocene compound comprises at least one of ferrocene or a titanocene.

Aspect 11: The curable composition of any of the preceding aspects, wherein the metallocene compound is present in an amount of 0.005 to 4 wt %, or 0.01 to 2 wt % based on the total weight of the curable composition.

Aspect 12: The curable composition of any of the preceding aspects, wherein the free radical polymerization inhibitor comprises at least one of hydroquinone, catechol, beta-naphthol, mono-t-butylhydroquinone, pyrogallol, 4-methoxy phenol, 4-tert-butylphenol, 2,5-di-tert-butylhydroquinone or 2,6-di-tertbutyl-4-methylphenol.

Aspect 13: The curable composition of any of the preceding aspects, wherein the free radical polymerization inhibitor is present in an amount of 0.001 to 1 wt % based on the total weight of the curable composition.

Aspect 14: The curable composition of any of the preceding aspects, wherein the acidic anionic polymerization inhibitor comprises at least one of a lewis acid, a carboxylic acid, or a sulfonic acid.

Aspect 15: The curable composition of any of the preceding aspects, wherein the acidic anionic polymerization inhibitor is present in an amount of 0.001 to 1 wt % based on the total weight of the curable composition.

Aspect 16: The curable composition of any of the preceding aspects, further comprising a multifunctional oligomer.

Aspect 17: The curable composition of any of the preceding aspects, further comprising a multifunctional (meth)acrylate oligomer that comprises at least one of polyethyleneglycol diacrylate, polypropyleneglycol diacrylate. polybutyleneglycol diacrylate, propoxylated trimethylolpropane triacrylate or ethoxylated trimethylolpropane triacrylate.

Aspect 18: The curable composition of Aspect 16 or 17, wherein the multifunctional (meth)acrylate oligomer is present in an amount of greater than 0 to 60 wt % based on the total weight of the curable composition.

Aspect 19: The curable composition of any of the preceding aspects, further comprising a photoinitiator.

Aspect 20: The curable composition of any of the preceding aspects, further comprising a photoinitiator in an amount of greater than 0 to 4 wt % based on the total weight of the curable composition.

Aspect 21: The curable composition of any of the preceding aspects, further comprising a (meth)acrylate monomer.

Aspect 22: The curable composition of any of the preceding aspects, further comprising a (meth)acrylate monomer in an amount of greater than 0 to 30 wt % based on the total weight of the curable composition.

Aspect 23: The curable composition of any of the preceding aspects, further comprising a filler, a silane coupling agent, a photosensitizer, a colorant, a flame retardant, a free radical polymerization initiator, a viscosity modifier, an electrically conductive component, a thermally conductive component, a defoamer, an adhesion promoter, a reactive diluent, or a plasticizer.

Aspect 24: A curable composition comprising: 0.1 to 30 wt % of an acid catalyzed urethane (meth)acrylate oligomer having a structure of at least one of Formula (1) or Formula (2) that was made with 0.05 to 6 wt % of the acid catalyst based on the total weight of the urethane (meth)acrylate oligomer:

$$A\text{-}D\text{-}(PD)_n\text{-}A \quad (1)$$

$$A\text{-}(PD)_n\text{-}P\text{-}A \quad (2)$$

wherein each A independently is a monohydroxy functional (meth)acrylate group; each D independently is derived from a di- or tri-functional isocyanate group; each P independently is derived from a polyol having a weight average molecular weight of 50 to 12,000 Daltons based on polystyrene standards; and n is 10 to 100; 20 to 98 wt % of a cyanoacrylate monomer; 0.005 to 4 wt %, or 0.01 to 2 wt % of a metallocene compound; 0.001 to 1 wt % of a free radical polymerization inhibitor; and 0.01 to 0.1 wt % of an acidic anionic polymerization inhibitor.

Aspect 25: A cured composition derived from any of the preceding curable compositions.

Aspect 26: An article or a coating comprising the cured composition of Aspect 25, wherein the article can be a medical device, an electronic device, or a nail.

Aspect 27: A method of making a cured composition comprising: curing the curable composition, for example, of any of Aspects 1 to 22 by exposing it to light to form the cured composition; and optionally forming the curable composition prior to the curing.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. The term "combination" is inclusive of blends, mixtures, alloys, reaction products, and the like. Also, "at least one of" means that the list is inclusive of each element individually, as well as combinations of two or more elements of the list, and combinations of at least one element of the list with like elements not named.

The term "or" means "and/or" unless clearly indicated otherwise by context. Reference throughout the specification to "an aspect", "another aspect", "some aspects", and so forth, means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

Unless specified to the contrary herein, all test standards are the most recent standard in effect as of the filing date of this application, or, if priority is claimed, the filing date of the earliest priority application in which the test standard appears.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," such as 10 to 23 wt %, etc.).

Unless defined otherwise, technical and scientific terms used herein have the same meaning as is commonly understood by one of skill in the art to which this disclosure belongs. The weight average molecular weight can be measured using gel permeation chromatography (GPC) or size exclusion chromatography (SEC).

Compounds are described using standard nomenclature. As used herein, the term "(meth)acrylate" encompasses both acrylate and methacrylate groups.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A curable composition comprising:
   an acid catalyzed urethane (meth)acrylate oligomer comprising an acid catalyst;
   a cyanoacrylate monomer;
   a metallocene compound;
   a free radical polymerization inhibitor; and
   an acidic anionic polymerization inhibitor.

2. The curable composition of claim 1, wherein the acid catalyzed urethane (meth)acrylate oligomer has a structure of at least one of Formula (1) or Formula (2):

A-D-(PD)$_n$-A                (1)

A-(PD)$_n$-P-A                (2)

wherein each A independently is a monohydroxy functional (meth)acrylate group; each D independently is a di- or tri-functional isocyanate group; each P independently is a polyol having a weight average molecular weight of 100 50 to 12,000 Daltons based on polystyrene standards; and n is 1 to 100.

3. The curable composition of claim 1, wherein the acid catalyzed urethane (meth)acrylate oligomer comprises at least one of:
   a polyester of hexanedioic acid and diethylene glycol, reacted with isophorone diisocyanate, capped with 2-hydroxyethyl (meth)acrylate;
   a polypropylene glycol reacted with tolyene-2,6-diisocyanate, capped with 2-hydroxyethyl (meth)acrylate;
   a polyester of hexanedioic acid and diethylene glycol, reacted with 4,4'-methylenebis(cyclohexyl isocyanate), capped with 2-hydroxyethyl (meth)acrylate;
   a polyester of hexanedioic acid, 1,2-ethanediol, and 1,2 propanediol, reacted with tolylene-2,4-diisocyanate, capped with 2-hydroxyethyl (meth)acrylate;
   a polyester of hexanedioic acid, 1,2-ethanediol, and 1,2 propanediol, reacted with 4,4'-methylenebis(cyclohexyl isocyanate), capped with 2-hydroxyethyl (meth)acrylate;
   a polyester of hexanedioic acid, diethylene glycol, reacted with isophorone diisocyanate, capped with 2-hydroxyethyl (meth)acrylate;
   a polytetramethylene glycol ether reacted with 4,4'-methylenebis(cyclohexylisocyanate), capped with 2-hydroxyethyl (meth)acrylate; or
   a polypropylene glycol reacted with tetramethylxylene diisocyanate, capped with 2-hydroxyethyl (meth)acrylate.

4. The curable composition of claim 1, wherein the curable composition comprises 0.1 to 30 wt % of the acid catalyzed urethane (meth)acrylate based on the total weight of the curable composition.

5. The curable composition of claim 1, wherein the acid catalyst comprises at least one of a nonmetallic Lewis acid or an organic acid.

6. The curable composition of claim 1, wherein the acid catalyst is present in an amount of 0.05 to 6 wt % based on the total weight of the urethane(meth)acrylate oligomer.

7. The curable composition of claim 1, wherein the cyanoacrylate monomer has the structure

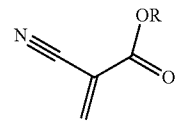

wherein R is a C$_{1-15}$ alkyl, alkoxy alkyl, cycloalkyl, alkenyl, aralkyl, aryl, allyl, or haloalkyl group.

8. The curable composition of claim 1, wherein the cyanoacrylate monomer comprises at least one of methyl cyanoacrylate, ethyl-2-cyanoacrylate, propyl cyanoacrylate, butyl cyanoacrylate, octyl cyanoacrylate, allyl-2-cyanoacrylate, or β-methoxyethyl-2-cyanoacrylate.

9. The curable composition of claim 1, wherein the curable composition comprises 20 to 98 wt % of the cyanoacrylate monomer based on the total weight of the curable composition.

10. The curable composition of claim 1, wherein the metallocene compound comprises at least one of ferrocene or a titanocene.

11. The curable composition of claim 1, wherein the metallocene compound is present in an amount of 0.005 to 4 wt % based on the total weight of the curable composition.

12. The curable composition of claim 1, wherein the free radical polymerization inhibitor comprises at least one of hydroquinone, catechol, beta-naphthol, mono-t-butylhydroquinone, pyrogallol, 4-methoxy phenol, 4-tert-butylphenol, 2,5-di-tert-butylhydroquinone, or 2,6-di-tertbutyl-4-methylphenol.

13. The curable composition of claim 1, wherein the free radical polymerization inhibitor is present in an amount of 0.001 to 1 wt % based on the total weight of the curable composition.

14. The curable composition of claim 1, wherein the acidic anionic polymerization inhibitor comprises at least one of a lewis acid, a carboxylic acid, or a sulfonic acid.

15. The curable composition of claim 1, wherein the acidic anionic polymerization inhibitor is present in an amount of 0.001 to 1 wt % based on the total weight of the curable composition.

16. A cured composition derived from claim 1.

17. An article or a coating comprising the cured composition of claim 1, wherein the article can be a medical device, an electronic device, or a nail.

18. A curable composition comprising:
   0.1 to 30 wt % of an acid catalyzed urethane (meth)acrylate oligomer having a structure of at least one of Formula (1) or Formula (2) that was made with 0.05 to 6 wt % of an acid catalyst based on the total weight of the urethane (meth)acrylate oligomer:

$$A\text{-}D\text{-}(PD)_n\text{-}A \quad (1)$$

$$A\text{-}(PD)_n\text{-}P\text{-}A \quad (2)$$

wherein each A independently is a monohydroxy functional (meth)acrylate group; each D independently is derived from a di- or tri-functional isocyanate group; each P independently is derived from a polyol having a weight average molecular weight of 50 to 12,000 Daltons based on polystyrene standards; and n is 10 to 100;

20 to 98 wt % of a cyanoacrylate monomer;

0.005 to 4 wt % of a metallocene compound;

0.001 to 1 wt % of a free radical polymerization inhibitor; and 0.01 to 0.1 wt % of an acidic anionic polymerization inhibitor.

19. The curable composition of claim 18, wherein the acid catalyst comprises at least one of a nonmetallic Lewis acid or an organic acid;

the cyanoacrylate monomer comprises at least one of methyl cyanoacrylate, ethyl-2-cyanoacrylate, propyl cyanoacrylate, butyl cyanoacrylate, octyl cyanoacrylate, allyl-2-cyanoacrylate, or β-methoxyethyl-2-cyanoacrylate;

the metallocene compound comprises at least one of ferrocene or a titanocene;

wherein the free radical polymerization inhibitor comprises at least one of hydroquinone, catechol, beta-naphthol, mono-t-butylhydroquinone, pyrogallol, 4-methoxy phenol, 4-tert-butylphenol, 2,5-di-tert-butylhydroquinone, or 2,6-di-tertbutyl-4-methylphenol; and the acidic anionic polymerization inhibitor comprises at least one of a lewis acid, a carboxylic acid, or a sulfonic acid.

20. A method of making a cured composition comprising:

curing a curable composition by exposing it to light to form the cured composition; wherein the curable composition comprises an acid catalyzed urethane (meth)acrylate oligomer comprising an acid catalyst;

a cyanoacrylate monomer;

a metallocene compound;

a free radical polymerization inhibitor; and an acidic anionic polymerization inhibitor.

\* \* \* \* \*